United States Patent Office 2,962,351
Patented Nov. 29, 1960

2,962,351

TREATMENT FOR IMPROVING THE OPERATION OF STRONG BASE ANION EXCHANGE RESINS

Peter C. Stevenson, Livermore, Calif., assignor to the United States of America as represented by the United States Atomic Energy Commission No Drawing. Filed May 23, 1957, Ser. No. 661,263

2 Claims. (Cl. 23—87)

This invention relates in general to anionic exchange resins and, more particularly, to processes for treating strongly basic anion exchange resins to improve the behavior thereof in separatory and purification processes.

A most extensively employed type of anionic exchange resin is that which, basically, constitutes an inert hydrocarbon polymer or resin having incorporated therein a large number of quaternary ammonium substituent groups which serve as the active functional anion exchange sites. Due to the extreme basicity of the functional groups the indicated resins have been termed "strongly basic" anionic exchange resins. A large proportion of such resins are produced by polymerizing styrene monomers alone or copolymerizing with other monomeric materials together with varying amounts of divinyl compounds to yield polymers with various degrees of cross linking.

A large variety of physical forms and otherwise modified anionic exchange resins are produced for advantageous operation under various conditions; however, these resins are fundamentally an organic polymeric base having quaternary ammonium base active anion exchange substituent groups therein. Due to probable similarities in behavior due to the fundamental similarities noted above, such resins generally are believed amenable to treatment with the process of the invention.

More specifically, strong basic anion exchange resins distributed under the trade names Dowex 1 and Dowex 2 (Nalcite SAR) may be so processed. These materials are stated by the manufacturer to be equivalent in function and substantially the same and are manufactured by procedures which are substantially the same as described in Examples 2 and 4 of United States Patent No. 2,614,099 filed December 28, 1948, and issued October 14, 1952. Moreover, details of composition and various significant characteristics of such materials are disclosed in an article in Ind. and Eng. Chem., vol. 43, pages 1088–1093, May 1951, entitled "Properties of Strongly Basic Anion Exchange Resins." Therein said highly basic resins are characterized as being a quaternary ammonium salt $(RR'R''R'''N^+.A^-)$ in which one of the R's is derived from polystyrene which is cross-linked with divinyl benzene. In Dowex 1 three of the R groups in the general quaternary salt structures are methyl groups whereas in Dowex 2 one of the methyl group is replaced by hydroxy ethyl.

In summary said patent indicates that such resins are prepared from the normally benzene-insoluble copolymers of monovinyl aromatic compounds and a polyvinyl-aromatic compound in the proportions of 0.5 to 40%, preferably 0.5 to 20%, by weight of the polyvinyl-aromatic compound interpolymerized with the monovinyl-aromatic compounds. The latter are selected from the benzene and naphthalene series, i.e., contain not more than 10 carbon atoms and may contain in addition to the vinyl radical, from 1 to 3 halogen or lower alkyl radicals other than a tertiary alkyl radical attached to the aromatic nucleus. The polyvinyl compounds are also selected from the benzene and naphthalene series and the mixture is copolymerized by any of the usual methods employed to polymerize monomeric vinyl type compounds. The product, after washing and drying, is reacted with a halomethylating agent in the presence of a catalyst until at least one halomethyl radical per 5 aromatic nuclei and usually 0.8 to 1.2 of such groups is introduced into the resin.

After washing and, optionally drying, the foregoing polymer is halogenated in the presence of a catalyst to introduce 0.5 to 2.5, preferably 0.8 to 1.5, halogen atoms per alkyl radical on an aromatic nucleus. The foregoing after washing are then reacted with a tertiary mono- or di-alkyl N substituted alkanol or alkanediol amine to form either the quaternary ammonium base anion exchange resin or a salt thereof. One to three molecular proportions of the tertiary amine per halomethyl radical in the vinyl-aromatic resin may be used.

The strongly basic anion resins have been utilized in diverse processes for the separation and purification of metallic and other ions contained in solutions. In these processes the anions or anionic complexes are selectively adsorbed and/or selectively eluted by providing appropriate solution compositions, pH, temperature or utilizing an appropriate procedure such as chromatographic, batch, or continuous operation. It is always desired to obtain a high degree of selectivity in separation processes with adequate processing capacity to provide the best separations and purifications with economy. However, with commercially available resins it has been found that, e.g., in chromatographic separations, certain metallic anions do not elute in a sharp band or may be retained inordinately so as to lower the resin capacity or even "poison" the column for effective operation. This term "poison" is intended to indicate in the present connotation that a particular ion is absorbed by the resin in such a manner that it cannot be effectively removed from the resin by usual elution methods without damaging the resin or lowering the operating efficiency thereof.

For example, in chromatographic and other types of anionic exchange processes a mixture of metallic values such as uranium fission products can be adsorbed from an aqueous acidic chloride solution by contact with a strongly basic anion exchange resin and the values selectively eluted therefrom by varying the pH, chloride ion concentration and other conditions. In the event that Zn and Cd are present in the original solution and especially if the solution has a HCl concentration of from about 0.1 to 3 M, optionally at about 2 M, concentrations, the zinc and cadmium are effectively adsorbed. Ordinarily, such materials are then eluted with water or very dilute HCl solutions, preferably hot solutions. The Zn can be selectively eluted with 0.01 M HCl ahead of the Cd which can then be eluted with HCl of below about $10^{-3}$ M concentration, e.g., to produce purified tracers. Substantially any material which may occur in a fission product mixture, i.e., U, aluminum cladding and the other fission products, can thusly be separated from the Zn and Cd in a single adsorption-elution cycle.

However, such elution techniques have been found to remove only about 25% of the zinc and 50% of the cadmium with the remainder adhering tightly to the column so as to behave as a "poison." These materials reduce the adsorptive capacity of the resin to a low level and may appear at an undesirable subsequent time in eluting other materials adsorbed on the resins or otherwise impair operations of the column. No treatment short of destruction of the resin has been found effective for removing these materials from such a resin. Other materials are known which behave similarly with other adsorption-elution cycles.

It has now been discovered that such resins may be treated with strong bases and oxidizing agents under certain conditions whereby the processed resin no longer unduly retains adsorbed ions and the elution thereof then occurs substantially complete in sharp and well-defined elutriant fractions. Thereby there may be effected an essentially complete separation and recovery of the cadmium and zinc values and there is no longer any interference with the subsequent elution and separation of other materials adsorbed on the resin. Moreover, the resin can ultimately be regenerated by usual means and utilized subsequently for similar or diverse other operations without danger of contamination or interference by the Zn and Cd.

Accordingly, it is an object of the invention to provide a method for treating strongly basic anionic exchange resins in order to eliminate the irreversible adsorption characteristic of the resin for certain metallic anions.

Another object of the invention is to provide a method for treating strongly basic anionic exchange resins to improve the desorption or elution characteristic thereof for anions which normally are at least partially irreversibly adsorbed thereon in anionic exchange processes.

Still another object of the invention is to provide a process wherein strongly basic anionic exchange resins are treated in a heated aqueous solution of a strong base with a strong oxidizing agent to improve the elution characteristics thereof for anions such as those of chloride complexes of Zn and Cd which are at least partially irreversibly adsorbed thereon in anionic exchange processes.

A further object of the invention is to provide a strongly basic anion exchange resin from which certain adsorbed anions including those of Zn and Cd can be more rapidly, completely and reproducibly eluted with aqueous elutriant solutions.

A still further object of the invention is to provide anionic exchange processes wherein there is employed a strongly basic anion exchange resin which has been treated with strong basic solutions and an oxidizing agent to effectively separate anions such as those of Zn and Cd which normally are at least partially irreversibly adsorbed from other materials in an aqueous solution.

One other object of the invention is to provide a quaternary ammonium type of strongly basic anionic exchange resin which is not poisoned by anions such as certain chloride complexes of Zn and Cd.

Other objects and advantages of the invention will become apparent by consideration of the following description and examples:

Strong base quaternary ammonium anionic exchange resins prepared by methods disclosed above, commercially available materials or equivalent materials which comprise a cross-linked copolymer of styrene and divinylbenzene or the equivalent having quaternary ammonium basic radical groups attached thereto are all amenable to treatment by the present processes. The resin is generally purchased graded to the desired size. The necessity for applying the treatment to any particular lot of such a resin is demonstrated simply by contacting a solution of the anion which is normally irreversibly adsorbed and later eluting by a conventional or standard method and determining by material balance the degree of retention of the interfering or "poison" ion. For example, with Zn and Cd, a chromatographic column of, e.g., 6 mm. diameter and 5–10 cm. length, containing a portion of the resin may be pre-equilibrated with 1–2 M HCl and then a few milliliters of a similar HCl solution containing milligram quantities of Zn and Cd are passed therethrough to deposit a chromatographic band of the anionic chloride complexes at the top of the column. Subsequently, the column is eluted with hot or boiling water and the shape of the elution peak determined by conventional methods or the amount of Zn and Cd retained is determined by analytical material balance of eluates or analysis of the resin. With radioactive species, column scanning with a counter will also indicate the adsorbed material.

Materials in which there is an undue degree of irreversible adsorption, undue broadening of the elution peaks or "trailing" elution of the indicated materials will be benefited by treatment in accordance with the process of the invention.

More particularly, strongly basic anionic exchange resins of the character described and in appropriate particle size are suspended in an aqueous solution of a strong base such as sodium or potassium hydroxides and heated to the boiling point with continuous stirring. The concentration of caustic is not critical and concentrations of about 1 to 4 M are used in practice but values outside this range may also be used. Heating is continued for a period of about 3 to 6 hours and small amounts of an oxidizing agent, preferably 30% hydrogen peroxide, are added from time to time. Certain other oxidizing agents such as sodium peroxide and hypochlorite may be used likewise. The heating period and amount of oxidizing agent are not particularly critical; however, it should be abundantly apparent that there must be a minimum heating time which would be scaled with variations in base concentration, rate of oxidizing agent addition and batch sizes.

At the completion of the foregoing treatment the resin is separated by filtration from the solution and is washed with several successive portions of hot and cold water. The treated resin is finally washed with an organic solvent such as a lower alcohol to complete removal of impurities, especially if the resin is to be employed in precise separations or analytical operations. The latter operation might be omitted in certain large scale operations.

Finally, the resin is converted to the chloride or other appropriate salt form for use in an anionic exchange process by contact with dilute HCl, other mineral acids or a salt solution. The treated resin may then be dried, packaged wet or transferred to ion exchange equipment, e.g., a chromatographic column, demineralizer, etc. and employed in anionic exchange processes. The effectiveness of the treatment is easily determined by repeating the test procedure, noted above, whereupon it is found that the Zn and Cd are no longer irreversibly adsorbed and the elution peaks or separations are more rapid and complete.

The theoretical reasons for the improvement in the behavior of the treated resin are not completely understood. The behavior of the untreated resin might be explained on the basis that lower amine, i.e., primary, secondary and tertiary amine functional groups were present in the resin along with the desired quaternary ammonium exchange sites. Some sort of equilibrium or other binding reaction might then occur between the functional groups so that the zinc and cadmium "poison" anions would be irreversibly adsorbed by the lower amine constituent groups. It is noted that both Zn and Cd are strongly complexed by ammonia. The present treatment process may be selectively effective in hydrolyzing or otherwise eliminating such lower amine groups from the resin so as to avoid the difficulty. Other beneficial results may accrue and the operability of the process as disclosed is not dependent on the validity of any particular theory.

Processes wherein the treated resin is used may range from a simple adsorption of Zn and Cd either alone or together from a HCl solution of about 1–3 M followed by elution with dilute HCl or water as indicated above in order to recover and purify said values, e.g., in ore treatments, refining or reclaiming operations. However, solutions containing a large variety of materials, e.g., fission product mixtures, or other very complicated mixtures, can advantageously be separated as required in analytical operations, group separation and the recovery of purified tracer values without interference from "poisons" by the use of such treated resin.

Further details of the methods of preparation and use of the treated resin of the invention will become apparent by consideration of the following specific examples:

Example I

A 5 pound quantity of a strongly basic quaternary ammonium anion exchange resin (Dowex 1) was dispersed in 3 liters of 3 M sodium hydroxide in a stainless steel kettle. The kettle was heated on a hot plate to a temperature near the boiling point and the temperature maintained for 3 hours with continuous stirring. One ml. of 30% hydrogen peroxide was added to the heated solution at half-hour intervals and heating was continued for one-half hour after the last addition. After cooling and settling excess solution was decanted and the resin was washed by decantation with 5 liter batches of water until the wash water gave a neutral reaction to indicator test paper. The resin was then washed twice by decantation with 3 liter quantities of methanol, twice with 5 liter quantities of water and finally slurried in 2 liters of water. Concentrated HCl was added until acidimetric paper showed the pH to be under 2 to convert the resin to the chloride form. The resin was finally washed with one additional 5 liter quantity of water and stored wet.

In testing the resin thusly prepared a quantity was packed while wet into a 6 mm. I.D. glass column with a constriction at the bottom from which the run-off could be controlled. Glass wool was used to position the resin above the outlet. A solution of 1-2 M HCl was passed through the column and drained to pre-equilibrate the resin. A few milliliters of a solution of 1-2 M HCl containing milligram quantities of reagent grade zinc and cadmium were then flowed into the top of the column. The zinc-cadmium values formed a band at the top of the column. The resin was then rinsed with 5 to 10 milliliter quantities of 1-2 M HCl and the zinc-cadmium values were eluted with hot water. Examination of the column and of the eluate showed that >90% of the values had been stripped from the column as contrasted with the low amounts ~25% Zn, ~50% Cd which could be eluted from the original resin.

Example II

Neutron irradiated uranium containing the usual amounts of transuranium elements, carrier materials and fission products is treated to produce a solution thereof in 1-2 M HCl of below about 1% concentration. Such a solution is then passed through a column of treated strongly basic anion exchange resin to adsorb various materials including the radioactive zinc and cadmium isotopes. With cc. amounts of solution a column similar to that described above can be used. The column is rinsed with an additional amount of 1 M HCl. Certain materials including U, Ga and In are not strongly adsorbed in the foregoing operation and appear in the effluent solution and rinse from whence they can be recovered by other processes. The Zn and Cd are then eluted simultaneously with hot water and separated subsequently by either conventional precipitation or ion exchange methods if desired. Alternatively, the Zn and Cd can be eluted separately as indicated above. Zn, Cd and other carriers can be added if the amount of these materials is too low for ordinary operations as is usual in radiochemical procedures.

With neutron irradiated uranium starting materials, certain material such as Ta, Nb, Tc, Sn, Sb, Br and I remain on the resin and can be eluted separately or in groups. For example, individual or group separations can be achieved by using progressively higher HCl, HNO$_3$ or H$_2$SO$_4$ elutions known in the art.

Example III

The value of the treated resin is demonstrated by a procedure useful in analytical work or for other purposes and capable of separating essentially all of the zinc, e.g., a radioactive species, from essentially any starting material, e.g., neutron irradiated uranium in admixture with mineral impurities such as those found in soil. A HCl solution of the material is produced by usual means employed in analytical or nuclear fuel processing chemistry and the following operation performed sequentially:

(1) (a) Adjust solution to 3 M HCl, add 5 drops Zn holdback solution (solution containing small amounts of Sb, Sn, Y, Mo, Ru, Cd, Zn, Te, Ba, La and Ce), one drop concentrated HI. Adsorb Zn on treated Dowex 1 resin previously equilibrated with 3 M HCl.
  (b) Wash with 10 ml. 0.5 M HCl containing one drop 4% KI.
  (c) Elute with boiling H$_2$O (35 ml.) containing one drop 4% KI.
(2) (a) Adsorb Zn on Dowex-50 column, a nuclear sulfonic acid cationic exchange resin in the hydrogen form (5-6 cm. of resin) directly from step 1c.
  (b) Wash with 10 ml. 1 M HNO$_3$.
  (c) Elute with 20 ml. 3 M HNO$_3$.
(3) (a) Add 5 ml. 6 M NaOH to elute, dilute to 30 ml., cool in ice bath until ice cold, add 5 ml. "Zn reagent." "Zn reagent" is a solution of $$K_2Hg(SCN)_4$$

prepared as described by Lundell and Bee (Trans. Am. Inst. Metals 8, 146 (1914) or Jamieson (JACS 40, 1036 (1918)). Stir well. Keep in ice bath for 10 minutes. Centrifuge.
  (b) Wash once with ice cold 1 M HNO$_3$.
(4) (a) Dissolve in 1.5 ml. warm concentrated HNO$_3$, adjust to 20 ml. (1 M HNO$_3$), cool in ice bath until ice cold, add 5 ml. "Zn reagent." Stir well. Keep in ice bath for 10 minutes. Centrifuge.
  (b) Wash once with ice cold 1 M HNO$_3$.
(5) (a) Dissolve in 1 ml. concentrated HNO$_3$, add 1 drop Fe, Zn, Cd carriers, dilute to 20 ml., ppt. with NaOH pellets (2 M in OH$^-$). Discard ppt.
  (b) Add a small volume of Fe(NO$_3$)$_3$ solution in water. Stir and discard the precipitate which forms. (Precipitate Fe(OH)$_3$.)
(6) Adjust to 3 M HCl. Repeat steps 1a, b, c; 2a.
(7) (a) Wash with 10 ml. 1 M HClO$_4$.
  (b) Elute with 20 ml. 3 M HClO$_4$.
(8) (a) Neutralize to one drop methyl red end point with NaOH pellets and 6 N NaOH. Add 3 ml. (NH$_4$)$_2$HPO$_4$ buffer. Digest in hot bath 5 minutes. If not crystalline, cent., digest in H$_2$O plus HPO$_4^-$ buffer until crystalline.
  (b) Wash twice with H$_2$O, once with acetone. Weigh as Zn(NH$_4$)PO$_4$.

Example IV

A similar procedure practiced for the recovery of Cd is as follows:

(1) Add Fe$^{+++}$, Mo and NO$_2^-$ to original solution from which Cd is to be recovered and make basic with NH$_4$OH; centrifuge and reject the precipitate.
(2) Acidify supernatant, add Fe$^{+++}$, make basic with NH$_4$OH, discard the precipitate which forms, transfer supernatant to Erlenmeyer flask.
(3) Boil to remove NH$_3$, add solid NaOH, boil to ppt. Cd(OH)$_2$, centrifuge, wash the precipitate twice with H$_2$O.
(4) Dissolve in 10 ml. 2 M HCl, add 1 drop Pb and Sb carriers, ppt. PdS and Sb$_2$S$_3$ with H$_2$S hot, discard ppt.
(5) Boil out H$_2$S briefly, pour onto treated A-1 column.
(6) Wash with 10 ml. 0.1 M HCl.
(7) Elute Cd with 20 ml. 1.5 M H$_2$SO$_4$, dilute to 40 ml. and transfer to hot bath.
(8) Add 1 drop concentrated NH$_4$OH, ppt. CdS, wash 2 times with H$_2$O, 2 times with acetone, dry, weigh.

What is claimed is:
1. In an ion exchange process for separating and re- covering cadmium and zinc from a dilute HCl solution mixture containing a mixture of metallic values, the steps comprising producing a suspension of a zinc and cadmium-free strongly basic anion exchange resin in an aqueous solution of sodium hydroxide of about 1 to 4 M concentration, heating said suspension for at least about three hours to a temperature near the boiling point, adding 1 ml. portions of 30 percent hydrogen peroxide per 3 liters of solution periodically during the heating period, separating and washing said resin, converting said resin to a salt form, pre-equilibrating a column of said treated resin with dilute HCl, contacting said solution of values with said resin whereby any zinc and cadmium present are adsorbed, and thereafter eluting substantially all of said zinc and cadmium values from said resin.

2. In an ion exchange process for separating and recovering metallic values from a solution mixture in which there is present anionic species selected from the group consisting of anions of zinc and cadmium which are ordinarily substantially irreversibly adsorbed by a strong base anion exchange resin, the steps comprising treating said zinc and cadmium-free resin while suspended in an aqueous dilute sodium hydroxide solution with an oxiding agent selected from the class consisting of hydrogen peroxide, sodium peroxide and sodium hypochlorite while heating to a temperature near the boiling point, separating said resin from the solution by a treatment including washing, converting said resin to a salt form, contacting said solution of metallic values with said resin under conditions wherein said anionic species of materials is ordinarily at least partially irreversibly adsorbed, eluting anions of said species away from other anions adsorbed on said resin and thereafter eluting substantially all of said species from said resin.

References Cited in the file of this patent

UNITED STATES PATENTS

| 2,730,486 | Coonradt et al. | Jan. 10, 1956 |
| 2,897,050 | Jaffe | July 28, 1959 |

OTHER REFERENCES

Journ. of Am. Chem. Soc., vol. 75, pages 1460–62 (Mar. 20, 1953).